Feb. 4, 1930.  J. HARTNESS  1,745,537
CRADLE CARRIAGE FOR COMPARATORS
Filed Sept. 20, 1927
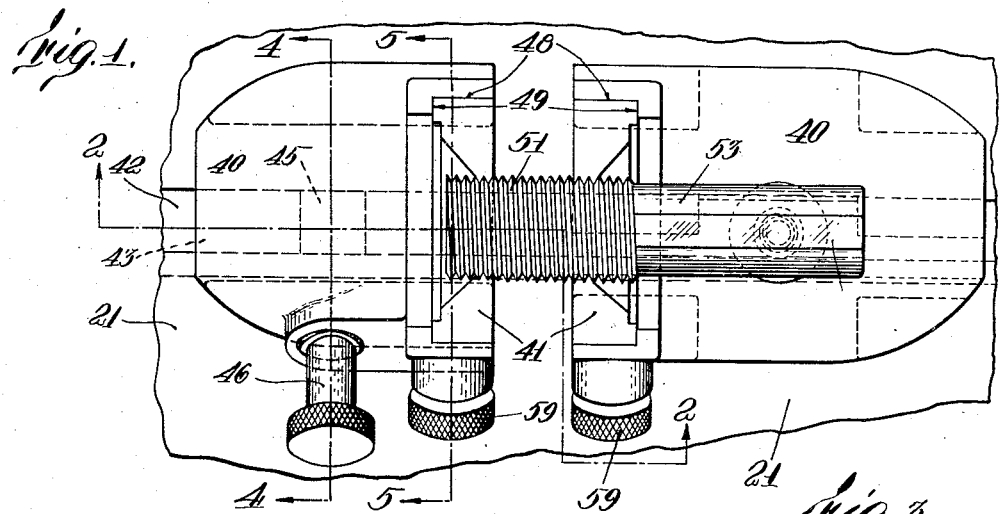
Inventor
James Hartness Patented Feb. 4, 1930

1,745,537

UNITED STATES PATENT OFFICE

JAMES HARTNESS, OF SPRINGFIELD, VERMONT

CRADLE CARRIAGE FOR COMPARATORS

Application filed September 20, 1927. Serial No. 220,694.

This invention relates to a device for replaceably holding an element in a certain adjusted position. An embodiment of the invention which is hereinafter described is designed for use with a comparator or optical apparatus for testing the threads of threaded objects such as screws, bolts, taps, and the like. A comparator suitable for use with my invention is described in Patent No. 1,377,068 granted May 3, 1921, or in improved form in an application of Hartness and Porter, Serial No. 31,746, filed May 2, 1925. As therein described, the comparator comprises, essentially, means for holding a screw-threaded body so that a beam of light is projected across its periphery, the outline image of the one or two threads in the path of the beam being magnified and cast on a screen which is suitably marked to indicate a standard outline, preferably with tolerance limits. A standard screw gage is inserted in the apparatus and adjusted so that the projected image of the thread lines up with the marks on the screen. Then the gage is replaced successively by screws to be tested, their shadow images being thrown on the screen and compared with the marks thereon. In order to allow a comparison of the lead or pitch of the threads of the various screws, the cradle or holder on which the gage and screws are successively placed is designed to fix the location of each screw for inspection by engaging a thread which is spaced from the thread whose image is projected on the screen. An error in pitch will therefore appear on the screen as a displacement of the thread image to the right or left. The location of point of engagement with reference to the beam of light or to the comparator as a whole is determined by the adjustment of the cradle which holds the gage or screw. For this purpose, the screw-holding cradle has heretofore been mounted on a carriage which is adjustable in a direction transverse to the beam of light, as described in application No. 31,746, hereinbefore mentioned. Each time the cradle has been removed, however, it has been necessary to readjust the carriage and cradle when the cradle was replaced on the carriage. By my invention, I provide improved clamping means by which it is always held accurately in a definite position relative to the carriage, so that if removed and replaced from a carriage which is in adjusted position, no further adjustment of the carriage is necessary.

For a more complete understanding of my invention, reference is had to the following description and to the drawing of which,—

Figure 1 is a fragmentary plan view of a table with carriages, cradles and a thread gage mounted thereon.

Figure 2 is a section on the line 2—2 of Figure 1.

Figure 3 is an end elevation of one of the carriages with its cradle.

Figures 4 and 5 are sections on the lines 4—4 and 5—5 of Figure 1.

Figures 6 and 7 are sections on the lines 6—6 and 7—7 of Figure 5.

Referring to the drawing in detail, 21 represents a fragmentary portion of a horizontal table which may be a part of a comparator. A pair of carriages 40, each holding a cradle 41, are mounted on the table for lateral adjustment relative to a beam of light which may be projected horizontally across the table by suitable apparatus not shown, and received by a suitable microscope 26 indicated in Figure 3, by which the outlined image of the thread in the path of the beam may be cast on a screen. In order to facilitate the adjustment and securing of the carriages 40, the table 21 may be provided with a groove or channel 42 to receive suitable lugs 43 formed on the bottoms of the carriages 40. In order to secure either carriage firmly in any desired position, the channel 42 may be undercut as at 44, this undercut portion being adapted to receive a movable block 45 which is carried between the lugs 43 of the carriage and may be moved into locking position as by a knurled screw 46 threaded to a stem 47 which may be formed integrally with the block 45. Each carriage 40 may be provided with an arcuate recess 48 to receive the cradle 41. A side of the recess 48 also constitutes a shoulder 49 against which the cradle may seat.

As shown in Figure 3, each cradle 41 may comprise a sector of a ring amounting to somewhat less than half of a complete ring. The outer periphery of the cradle is of a size to fit accurately in the arcuate recess 48 of the carriage and against the shoulder 49. The inner periphery of the cradle is preferably threaded and shaped to fit the threads 51 of a gage with which threaded elements are to be compared. The cradle itself may be clamped to the carriage by any suitable means. As shown, a pair of conical recesses 55, 56 are formed in its periphery, the recess 56 being adapted to receive the tapered end of a fixed pin 57 which is permanently set into the cradle-holding recess 48 of the carriage 40. The recess 55 is adapted to receive the tapering end of a screw member 58 which is threaded through a portion of the carriage 40 and is provided with a knurled head 59 by which its end may be advanced into or retracted from the recess 55. As indicated in Figures 6 and 7, the axes of the pin 57 and the screw 58 are not in the plane of the axes of the recesses 55, 56, but are displaced laterally toward the shoulder 49. When the screw 58 is set up so that its end enters the recess 55, the cradle is moved against the pin 57 and the reaction of the cradle against the pin 57 and the screw 58 clamps it tightly into the arcuate recess 48 of the carriage 40 and against the shoulder 49 so that its position relative to the carriage is definite, and it may be easily removed and accurately replaced.

In using the comparator for the inspection of threaded elements, a master gage 53 is first placed on the cradle 41, the apparatus of the comparator having previously been assembled in position. The carriages 40 may then be adjusted in the slot 42 to bring a thread of the gage 53, the image of which is to be thrown on the screen, directly in line with the beam of light entering the microscope 26, so that the outline image of the thread falls on the screen in proper relation to tolerance marks which may be thereon. Instead of using a previously marked screen or chart, a blank screen may be marked with reference to the image of the gage cast upon it. When the gage is in its desired position, one of the carriages 41 is securely clamped to the table 21, the other carriage preferably being left free to move. The fixed carriage is preferably so located that its cradle is laterally remote from the beam of light so that errors of pitch can be detected as hereinbefore described. By leaving one carriage loose, it can adjust its position to fit the thread of screws having errors of pitch or lead. After the carriages with the master gage thereon have been suitably adjusted, the gage may be replaced successively by the bolts or other threaded elements which are to be tested. The threaded inner peripheries of the cradles readily receive the elements which may be seated therein by a slight manual rotation. The magnified image of the thread projected on the screen of the comparator at once reveals whatever errors of diameter, shape or lead the screw may have. The clamping means which holds each cradle accurately in a definite position relative to its carriage makes it possible to remove and replace either cradle without readjusting the position of the carriage.

Having thus described a certain embodiment of my invention, it should be evident to those skilled in the art that various changes and modifications may be made therein without departing from its spirit or scope as defined by the appended claims.

I claim:—

1. Apparatus of the class described, comprising a carriage having an arcuate shouldered recess, a work-holding cradle having a portion shaped to fit in said recess against said shoulder, said cradle having a pair of recesses therein, and means carried by said carriage for engaging in the recesses in the cradle to press the cradle against said shoulder and into a definite position relative to said carriage and to clamp said cradle in said position.

2. Apparatus of the class described, comprising a carriage, a work-receiving cradle having recesses fitted on said carriage, and means for clamping said cradle on said carriage, said clamping means comprising a pair of conical elements positioned to enter said recesses eccentrically, one of said conical elements being movable into said recess to engage a side thereof.

3. Apparatus of the class described, comprising a carriage having a shouldered portion, a cradle fitted on said carriage and having a pair of tapering recesses, and means for clamping said cradle on said carriage against said shoulder, said means comprising a fixed tapering member adapted to enter one of said recesses eccentrically, and a movable tapering member adapted to enter the other recess eccentrically to bear against the side of the recess and to cooperate with said pin and shoulder to clamp the cradle in a definite position relative to said carriage.

In testimony whereof I have affixed my signature.

JAMES HARTNESS.